MAGNETIC TRANSDUCER

Filed Dec. 28, 1966 2 Sheets-Sheet 1

INVENTORS
JOHN R. MORRISON
DENNIS E. SPELIOTIS
BY
Roger S. Smith
ATTORNEY 3,479,663

MAGNETIC TRANSDUCER

John R. Morrison and Dennis E. Speliotis, Boulder, Colo., assignors to International Business Machines Corporation, Armonk, N.Y., a corporation of New York Filed Dec. 28, 1966, Ser. No. 605,242
Int. Cl. G11b *5/00*
U.S. Cl. 340—174.1 9 Claims

ABSTRACT OF THE DISCLOSURE

A modified structure of the writing head elements of a magnetic transducer assembly which provides self-compensation of fringing fields. Each head includes at the side edges which define a track edge during the writing operation, one or more head portions effective to have large eddy currents induced therein by the energizing signal applied to the head. These eddy currents, in turn, induce magnetic fields at the side edges of the head which are in opposition to the main writing flux and which effectively cancel the fringing fields at those edges, thus providing a sharp cut-off of the writing field at the track edge to write a clean track edge and eliminate interference fields.

SUMMARY OF INVENTION

The present invention relates to improvements in magnetic transducer assemblies for magnetic recording systems and, more particularly, to multi-track of multi-channel transducers which are arranged to concurrently perform reading and/or writing operations in plural tracks on a recording medium. Current technology in the data processing arts has created a need for higher and higher areal densities in magnetic recording systems such as magnetic tape storage units, disk storage units, drum storage units and the like. One way to increase areal density of recordings is to increase the portion of the storage media upon which information can be written. In systems which write information in plural tracks or channels, density can be increased by decreasing the distance between adjacent channels or tracks. In the past, the spacing between tracks has been influenced primarily by the writing apparatus. When parallel tracks are written by a transducer having plural recording heads, the leakage or fringing flux emanating from the side edges of each head has required that a substantial distance exist between elements to avoid interference. For example, in a conventional digital tape recording system, a data track is approximately 0.040 inch wide, and the inter-track spacing between adjacent tracks is about 0.018 inch.

By eliminating or substantially reducing the fringe fields and providing a sharp field gradient at the edge of a track to write a clean track edge, it is possible to substantially increase recording density by reducing the inter-track separation to much less than half that now employed.

The problem of interference between adjacent tracks in a recording transducer is not a new one and various approaches have been taken to reduce the fields and their effects. One such approach, which has provided a substantial improvement, is to provide between the writing heads in the assembly an inter-track shield comprised of magnetic material which forms a flux sink or return path for the leakage flux from the two heads separated by the shield, thus preventing the flux from one head from interfering with its neighbor. This approach, however, offers the possibility that if the fringing fields are strong, the flux picked up by the magnetic shield actually tends to write on the medium and creates unwanted noise.

It is the primary object of this invention to provide a transducer assembly including plural writing heads capable of writing at higher track densities than heretofore possible.

It is a more specific object of this invention to provide means for eliminating the fringing flux at the edge of a writing head and to provide a sharp field gradient which writes a clean track edge, thereby permitting higher density recording.

Still another object of the invention is to provide means for eliminating the need for a magnetic inter-track shield between writing heads of a multi-track transducer, and thus eliminate the problems associated with use of such a shield.

These objects are achieved by providing, as a part of the recording heads, means for eliminating interference between the heads writing on adjacent tracks due to the fringing fields which exist at the track edges. The invention contemplates modifying the structure of the recording head members so that the edges thereof that define the track boundaries on the recording medium establish fields which oppose the fringing fields normally present and eliminate them; thus providing for a sharp field gradient at each track edge and, consequently, producing tracks having well-defined edges. This invention thus permits closer track spacing than was formerly possible. By eliminating the fringing fields, the invention also eliminates the need formerly present in the prior art for a magnetic shield between tracks to shield one track from the fringing field of its neighbors.

The elimination of fringing fields at track edges is accomplished, according to a preferred embodiment of this invention, by providing a laminar head assembly which includes one or more copper or other conducting laminations adjacent the track edge, interpersed with the magnetic laminations forming the head. These copper laminations are a part of the operating head portion of the transducer and are coupled by the energizing windings of the head. They consequently have strong eddy currents induced therein which produce fields at the track edge in opposition to the fringing fields for opposing and cancelling these fields.

The foregoing and other objects, features and advantages of the invention will be apparent from the following more particular description of preferred embodiments of the invention, as illustrated in the accompanying drawings.

DRAWINGS

DETAILED DESCRIPTION

Before proceeding to a detailed description of this invention, definitions of several of the terms to be employed in describing the invention will be made to avoid confusion. The terms "transducer" or "transducer assembly" refer to the overall unit which reads or writes plural tracks of information on a recording medium. The term "head" refers to an individual element carried by the transducer for reading or for writing a single track of information. The term "working gap" refers to the air gap in the magnetic head member which causes flux to emanate from the head member to write information in a track on a recording medium, or which is used in a reading head to detect information.

Figures 1, 2:
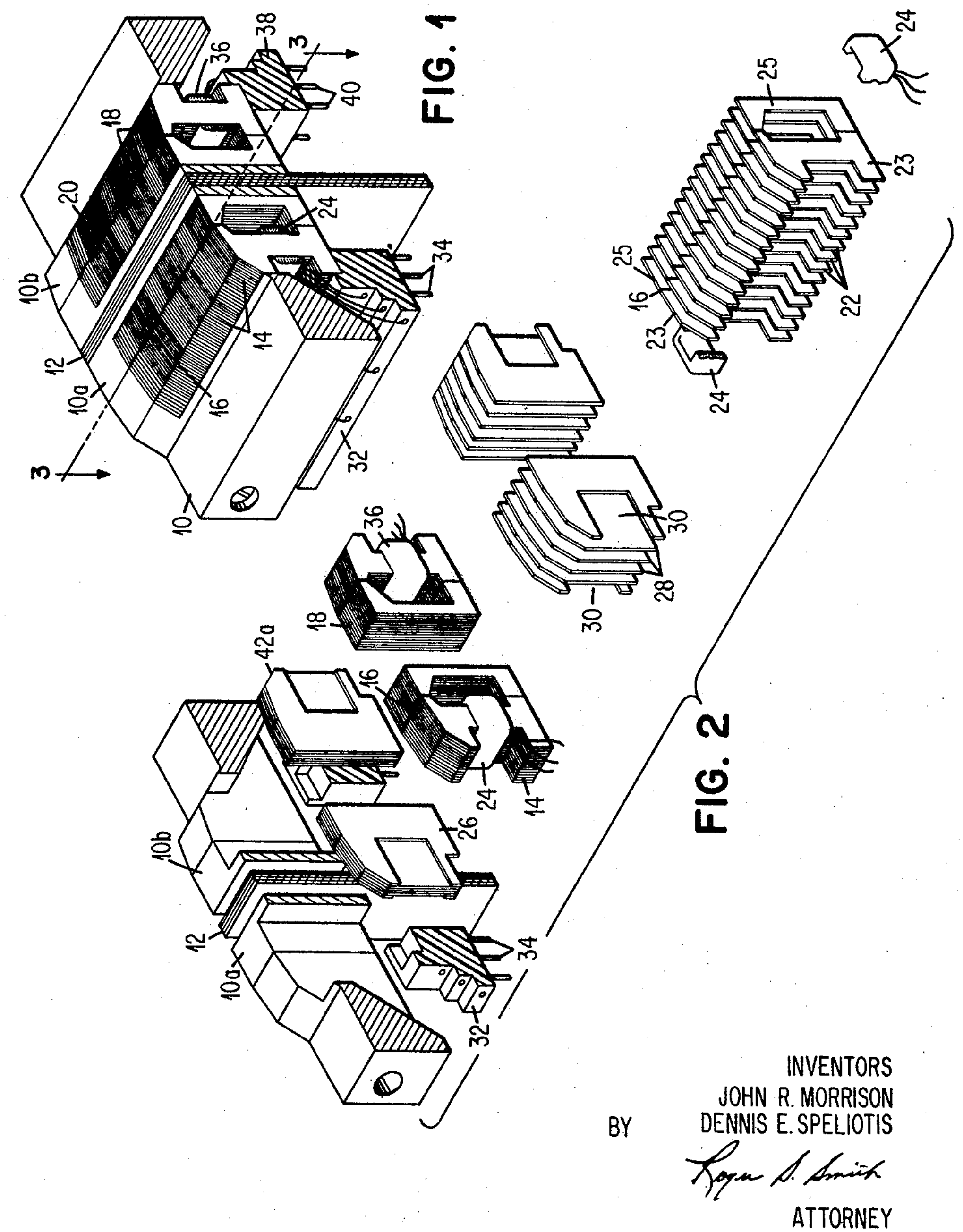
FIGURE 1 is a partial perspective view of a magnetic transducer embodying the present invention.
FIGURE 2 is an exploded perspective view of the transducer assembly, illustrating the laminations employed to make up the head members and the inter-track separations between head members.

Referring now in detail to the drawings, FIGURE 1 shows a typical multi-track transducer assembly embodying the present invention. The assembly comprises a nonmagnetic housing member 10, which may be of brass or another suitable non-magnetic material, and which supports the operative parts of the transducer. Housing 10 is divided into two sections 10*a* and 10*b* which are separated by transverse shield member 12. Each section 10*a* and 10*b* of the housing is constructed to support a plurality of transducing heads. A plurality of write heads 14 are supported in housing section 10*a* with the working gaps 16 exposed at the operating surface of the transducer assembly adjacent the recording medium (not shown) upon which reading and writing operations take place. The transducer assembly has one write head 14 for each parallel track or channel on the medium and the heads 14 are arranged in spaced-apart relation a distance equal to the distance necessary to separate tracks to prevent undue interference between them. A typical transducer may have, for example, nine write heads 14. As will become more apparent later herein, the present invention permits the heads 14 to be packed more closely together than heretofore possible, and allows more heads to be employed with a given width of recording medium.

The housing section 10*b* carries a like number of reading heads 18, which also have their working gaps 20 exposed at the operating surface of the assembly. The reading heads 18 are aligned longitudinally (that is, in the direction of relative motion between the transducer assembly and the recording medium) with the write heads 14 so that information recorded on any track may be read as it passes over the read head 18 associated with that information track.

Referring now to FIGURE 2, it will be seen that each write head is made up of a plurality of laminations 22. These laminations 22 are formed to provide two pole pieces 23 and 25 separated at one point to define the working gap 16. The pole pieces 23 and 25 are joined together at their lower ends to form a closed magnetic circuit. The laminations 22 are bonded together by a suitable cement, such as an epoxy resin, to form the composite member 14. No attempt has been made in this drawing to accurately illustrate the precise number of laminations employed, or to accurately depict their thickness. An energizing coil 24 is wound around one leg of the head 14 to control the generation of writing flux in the gap 16.

The several heads 14 are spaced apart in the housing 10*a* by inter-track shield members 26. Each member 26 is made up of plural laminations 28 as shown in FIGURE 2, the outermost ones of which are notched as indicated at 30 to provide room for the coils 24 on the heads 14. These shield members are conventionally made up of nonmagnetic electrically conductive material, such as copper or bronze laminations having one or more laminations of a magnetic material such as Mumetal at or near the center of the group. Again, no attempt is made in the drawing to accurately display the number and thickness of the members 28.

A connector block 32 having terminal pins 34 is mounted in the frame 10*a* to provide connections from the several write coils 24 to writing circuitry (not shown).

The read head carrying portion of the transducer assembly is constructed in a manner similar to that just described. As illustrated in FIGURES 1 and 2, the read heads 18 are also constructed of plural laminations bonded together, and sensing coils 36 are magnetically coupled to them. These coils are connected to appropriate reading circuitry through terminal pins 40 in connector block 38. Laminated inter-track shield members 42 are interspersed between the read heads 18 to control interference. The shield members 42 are constructed similarly to the shields 26.

Figure 3:
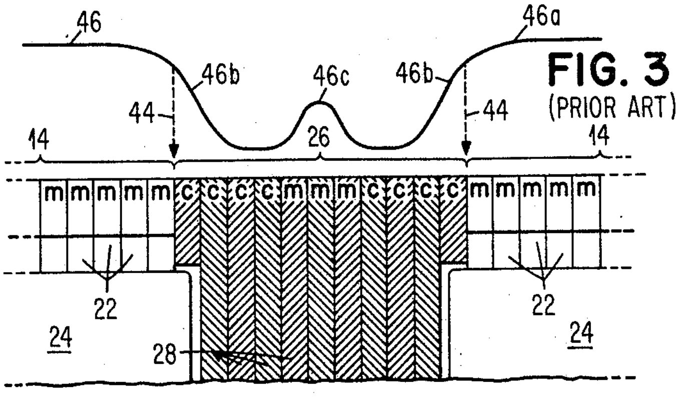
FIG. 3 (PRIOR ART)
FIGURE 3 is an enlarged partial sectional view taken along the lines 3—3 of FIGURE 1 and showing the configuration employed by a typical prior art device.
Figure 4:
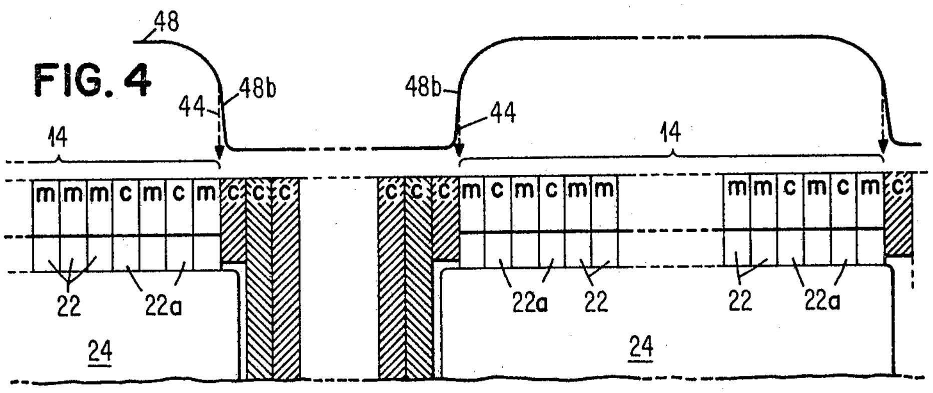
FIGURE 4 is a sectional view similar to FIGURE 3, but showing the lamination configurations provided in accordance with this invention.
Figure 5:
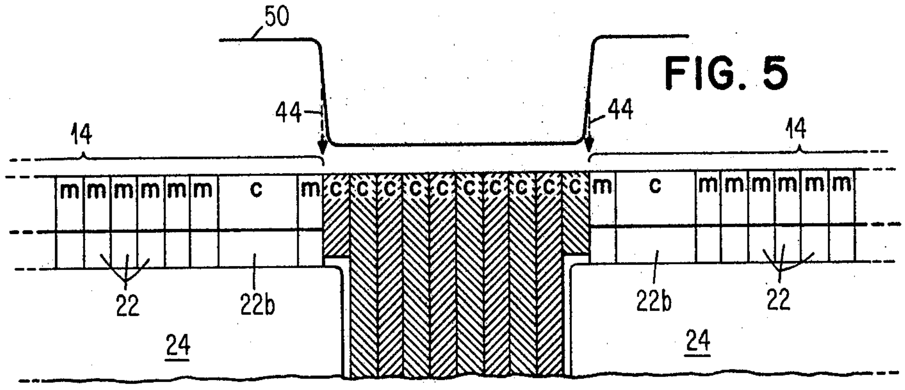
FIGURE 5 is a sectional view similar to FIGURE 4, but showing a modified embodiment of this invention.

The construction just described is known in the art. A detailed description of such an assembly and the method for constructing it may be found in U.S. Patent 3,064,333, assigned to this assignee. The present invention is directed toward the construction and arrangement of the laminated write heads 14 and their associated inter-track shield members 26. FIGURES 3, 4, and 5 illustrate this construction in detail.

FIGURE 3 shows a typical prior art head and inter-track shield arrangement. In this drawing, the several laminations 22 of the write heads and 28 of the inter-track shield are labeled at their upper ends with the symbols "*m*" or "*c*" that respectively identify the lamination material as magnetic or conductive. It will be noted that each of the laminations 22 of the heads 14 is of magnetic material and that those laminations 28 of the shield 26 near the track edges (such edges being identified by the vertical arrows 44) are of conductive material. At the center of each shield 26 a few magnetic laminations are provided. The purpose of the conductive laminations at the edges of the shield is to provide electrostatic shielding and the purpose of the magnetic laminations is to provide magnetic shielding between the adjacent heads 14.

Immediately above the apparatus shown in FIGURE 3 is a graph line 46 which indicates the field strength of the magnetic field produced by the heads when writing. The graph 46 represents the situation when the two adjacent heads shown are both operating. The portions 46*a* of the line indicate high field strength in the space immediately above the gaps in the heads 14. The line portions 46*b* and 46*c* indicate the lower fringing fields observed to exist in the inter-track area. It will be observed that the fringing fields represented by line portions 46*b* fall off at a fairly constant rate as the distance from the track edges increases, but that an appreciable field exists for some distance away from the edge. It will be further noted that the fringing field increases somewhat in the area of the centrally located magnetic shield members, as shown at 46*c*. This increase is apparently caused by the concentration of flux in the high permeability magnetic laminations of the shield; these laminations act as flux sinks. While the sink function provides an effective shield to prevent interference between adjacent heads 14, it offers the possibility of disturbing the magnetism of the recording medium; that is to say, writing on the medium, with the localized flux picked up by the magnetic laminations of the shield.

Effective inter-track shielding and the elimination of the fringing field indicated by the sloped portions 46*b* and 46*c* of the graph 46 is achieved in accordance with this invention by a unique arrangement of magnetic and nonmagnetic laminations in the heads 14, as shown in FIGURES 4 and 5. FIGURE 4 shows an arrangement in which, at the edge of each writing head 14, a few conductive laminations 22*a* are interspersed with the magnetic laminations 22 of the head. These conductive laminations 22*a* are shaped in the same manner as the magnetic laminations, having gaps therein, and they are encompassed by the energizing winding 24. These conductive laminations do not support the same writing flux as the magnetic laminations, but they have strong eddy currents generated therein which, in turn, induce magnetic fields at the track edges in opposition to the main writing fields. These opposing fields are found to effectively cancel the fringing flux normally observed at the track edges and they cause the writing field to fall off very sharply at each side edge of the track. Graph line 48 represents the field strength distribution in the space above the lamination configuration of FIGURE 4. It will be noted that the fringing field represented by line portions 48*b* decreases very sharply and the inter-track field strength over essentially the entire inter-track area is effectively zero.

The number of conductive laminations provided at each track edge may vary with the design of the head involved and will depend upon the thickness and number of laminations which make up the head. In a typical design, which may employ about thirty laminations each of 0.001 inch in thickness to make up a head of 0.040 inch (the overall thickness of the head is the sum of the thicknesses of the laminations, plus the thicknesses of the bonding cement layers), good clean track edges and effective interference avoidance may be achieved with as few as two conductive laminations 22*a* at each edge.

These laminations 22*a* should be alternated with magnetic laminations to preserve a fairly uniform field strength inside the track boundaries and, preferably, the outermost lamination on each side of the head should be of magnetic material. Several conductive laminations may be placed adjacent one another if desired, however, or a single thick conductive lamination such as that shown at 22*b* in FIGURE 5 may be employed to achieve the same result. In each case, it is essential that this thick lamination be a part of the head and within the coil 24. The determination of the proper thickness for a given head design is a matter of engineering design well within the purview of the skilled technician. The absence of fringing fields when the construction of FIGURE 5 is used is indicated by the shape of the graph line 50 in that drawing.

When either of the configurations of FIGURE 4 or FIGURE 5 is employed, it becomes unnecessary to provide magnetic shielding between heads since there is effectively no fringing flux to contend with. Accordingly, the inter-track laminations may all be conductive, or may include insulators, etc., as desired.

One substantial advantage enjoyed by this invention is that because of the elimination of fringing fields and the production of clean track edges, it is possible to place the heads 14 much closer together in the assembly than heretofore feasible. It has been found, for example, that tracks of thickness in the range of 0.040 inch can be placed as close as 0.004 inch apart with satisfactory results, whereas formerly as much as 0.018 inch separation was required. It will be apparent that such packing freedom will permit much more effective utilization of the storage media.

The foregoing description has identified the laminations which combine to form the various elements of the transducer assembly as "magnetic" or "conductive" without restriction as to the specific materials used. Those skilled in the art will be aware of many magnetic and conductive materials which may be suitable. Examples of magnetic materials are Mumetal, Permalloy, etc.; and examples of conductive materials include copper, bronze, etc. It is possible, in the case of the thick laminations 22*b*, shown in FIGURE 5, to make these thick eddy current-producing laminations of a material which will have the main field flux induced therein as well as the opposing eddy current flux. Such will be the case if magnetic material having conductive properties is used. Mumetal is an example of such a material. It has been found, however, that the fringing field elimination produced by such an arrangement is not as efficient as that provided by the embodiments of FIGURES 4 and 5.

While the invention has been particularly shown and described with reference to preferred embodiments thereof, it will be understood by those skilled in the art that various changes in form and details may be made therein without departing from the spirit and scope of the invention.

What is claimed is:

1. In a magnetic transducing head which includes a group of discrete laminations of magnetic material bonded together in side-by-side relation, the outermost ones of said laminations defining side edges of the head, said laminations each forming a magnetic circuit having a transducing gap therein, and an energizing coil magnetically coupled to all of said laminations for producing a field capable of writing a track of information on a moving magnetic record medium, said track having a width substantially co-extensive with the distance between the said side edges of the head, the improvement in means for reducing fringing fields at the side edges of said head comprising:

fringing field-reducing means provided among said laminations adjacent each side edge of said head and coupled to said energizing coil, said means being responsive to operation of said energizing coil for producing a field adjacent each side edge of the said head which opposes and cancels the fringing fields at the side edges of the head.

2. The invention described in claim 1 wherein said fringing field-reducing means comprises at least one fringing field-reducing lamination positioned in said group of laminations adjacent each side edge of the head and being coupled to said energizing coil, said fringing field-reducing laminations being constructed of a material having an electrical conductivity equivalent to or gerater than that of copper so as to have significantly larger eddy currents induced therein than the other laminations upon operation of the energizing coil whereby to provide eddy current fields at the side edges of the head which oppose and cancel the fringing fields.

3. The invention defined in claim 2 wherein the fringing field-reducing laminations are formed of copper.

4. The invention defined in claim 2 wherein the fringing field-reducing laminations are thicker than the other laminations of said head.

5. The invention defined in claim 1 wherein the fringing field-reducing means comprises at least two conductive fringing field-reducing laminations positioned adjacent each side edge of said head, said fringing field-reducing laminations being separated by at least one magnetic lamination.

6. A magnetic transducer assembly comprising frame means, a plurality of magnetic transducing heads supported in said frame means in spaced-apart side-by-side relation, each said magnetic transducing head including a group of discrete laminations of magnetic material bonded together in side-by-side relation, said laminations each forming a magnetic circuit having a transducing gap therein, and an energizing coil magnetically coupled to said laminations for producing a field capable of writing a track of information on a moving magnetic record medium, said track having a width substantially co-extensive with the distance between the said side edges of the head, the improvement in means for reducing interference between said spaced-apart heads in said transducer assembly comprising:

(a) at least two fringing field-reducing laminations positioned in each group of laminations, said fringing field-reducing laminations being positioned adjacent the outermost laminations in each group and being coupled to the energizing coil for their corresponding group of laminations, said fringing field reducing laminations being formed of an electrically conductive material having an electrical conductivity equivalent to or greater than that of copper so as to have significantly larger eddy currents induced therein than the other laminations of their groups upon energization of the energizing coil to provide fields adjacent the side edges of the respective groups of laminations which oppose and cancel those parts of the fields generated by the magnetic heads which would tend to interfere one with the other; and (b) separating means between the spaced-apart heads in said transducer assembly, said separating means being formed wholly of non-magnetic material.

7. The invention defined in claim 6 wherein the fringing field laminations are formed of copper.

8. The invention defined in claim 7 wherein the separating means comprise plural copper laminations.

9. The invention defined in claim 1, wherein said fringing field-reducing means comprises at least one conductive lamination adjacent each side edge of the head, said conductive lamination being spaced inwardly toward the middle of the head from the adjacent side edge by at least one lamination of magnetic material.

References Cited

UNITED STATES PATENTS

| | | | |
|---|---|---|---|
| 2,807,676 | 10/1957 | Lynn ------------ | 179—100.2 |
| 3,185,971 | 5/1965 | Brette et al. ------- | 340—174.1 |

STANLEY M. URYNOWICZ, Jr., Primary Examiner

J. I. ROSENBLAT, Assistant Examiner

U.S. Cl. X.R.

179—100.2